Patented Sept. 22, 1925.

1,554,917

UNITED STATES PATENT OFFICE.

GEORGE KUNKLE, OF GRAND JUNCTION, COLORADO.

PROCESS OF TREATING ORES.

No Drawing.  Application filed March 27, 1923. Serial No. 628,046.

*To all whom it may concern:*

Be it known that I, GEORGE KUNKLE, a citizen of the United States, and a resident of Grand Junction, in the county of Mesa and State of Colorado, have invented a new and Improved Process of Treating Ores, of which the following is a full, clear, and exact description.

This invention relates to a process of treating ores, and has for an object the provision of an economical, practical, commercial process whereby ores and concentrates can be treated at the mines with such simple agents as water and fuel without the usual regard for transportation facilities or proximity to chemical manufacturing centers, owing to the fact that with the exception of a precipitant no commercial chemicals, other than fuel and water, above mentioned, are actually consumed in the operation of the process.

Another object is to provide a process in which the usual acid solvents or heavy chemicals for fluxing, roasting, leaching and separating certain constituents of the ore from its earthly impurities are dispensed with entirely, and the cost of the process is correspondingly reduced, plus the advantage of treating such ores at or near the point where they originate, thus dispensing with the necessity and expense of the usual concentration methods employed on the lower grade ores.

A further object is to provide a process which is applicable to the treatment of vanadium ores and the extraction therefrom of vanadium and its products.

In a general consideration of this process, it consists in comminuting the ore to a suitable size, treating it in a suitable furnace to a relatively high degree of heat in the desired atmosphere, preferably oxidizing, in order to decompose the compounds from insoluble vanadates to water soluble ones, and then, after the heat treatment, in lixiviating and agitating the ore from the furnace in hot water, whereby the solvent compounds or products of vanadium of the particular element being extracted are dissolved in water, from which they can be separated by any one of several well known processes.

The process further includes steps whereby ores of varying characteristics can be balanced by the addition thereto of known ingredients so that the resultant product as charged into the furnace will have a definite constitution so that the action of the heat and oxidizing atmosphere will have the desired effect. The process further comprises several other steps for the purpose of insuring that the ultimate product will be as desired, although the character of the material as it is mined will vary over a wide range.

More specifically, the process includes the pulverizing or comminuting of the ore or concentrate by passing it through a 60- or 70-mesh sieve. The size to which the ore is comminuted may be varied widely to suit the recovery of any other values that may remain in the residue. The ore is charged into a furnace, preferably of the reverberatory type, and heated to a temperature in the neighborhood of 900 to 1100 degrees C. for a period from 45 to 60 minutes. However, this is only an example of the degree of heat and the time of treatment because, owing to the varying characteristics of ores which can be treated by this process, I do not limit my invention to either this specific temperature or duration of time. Preferably, however, the charge in the furnace is treated to this heat in an oxidizing atmosphere, preferably using atmospheric oxygen, although any other oxidizing reagent, such as potassium chlorate, sodium nitrate, or their equivalents, may be employed. On the other hand, in working some special types of ores exceedingly rich in vanadium and reducing agents, it may also be advantageous to employ a semi-oxidizing or even a reducing condition in the furnace, thereby extracting the vanadium or the metal desired subsequently as a mixture of the various oxides.

The object of this heating of the ore or concentrates, preferably in an oxidizing atmosphere, is to decompose certain natural vanadates of the ore which are insoluble in water, and to bring about their recombination so as to form a water soluble vanadate. The constitution of this water soluble vanadate is unknown, but analysis shows that its composition includes iron and the alkaline earth metals, which vary with the character of the ore, and that it also contains from 30 per cent to 45 per cent of vanadic acid with ferric salts quantitatively predominating in the balance. The composition of the water soluble compound may not be a vanadate necessarily but may be a colloidal solution of vanadic acid in admixture with colloidal iron salts and a substantial trace of the alkaline earth metal.

However, if any of these necessary constituents of a proper water soluble vanadate or metallic product are lacking in the ore or concentrate, this concentrate may be enriched in these elements or ingredients in any convenient manner, preferably by combining various types of ores or concentrates to form the desired balance. On account of the variable conditions under which this water soluble vanadate is formed no set rule can be given, but I find it desirable to avoid a high percentage of calcium carbonate, and, at the same time, to have a low percentage of iron. As a rule the average ore contains these elements in the proper equilibrium and this extra step of balancing the ingredients may ordinarily be eliminated.

After the ore has been subjected to the heat treatment in the furnace, the partly caked ore or concentrates are comminuted to the same mesh in which it was fed to the furnace and is then thoroughly lixiviated and agitated with water, preferably at a temperature in the neighborhood of 90 degrees C. This action dissolves the vanadic acid as a soluble vanadate of iron and the alkaline earth metals. This salt of vanadic acid is probably of the ortho or pyro type since the saturated solution immediately hydrolyzes, depositing a portion of its alkaline constituent as hydroxide and forming a stable, yellow solution of the meta salt, which can be evaporated to dryness without its undergoing any further decomposition. If a semi-oxidizing or reducing condition is employed in the furnace during the heating of some special types of ores or chemically unchanged concentrates derived therefrom, then these solutions of water soluble vanadates are dark green, containing a mixture of various oxides of vanadium, and it is found that boiling the residue with the large last volume of wash water considerably augments the extraction in this instance.

After the separation of this liquid, containing the water soluble vanadates, from the residue the vanadium salts may be recovered in any suitable manner.

In working an ore or concentrate which is lean in iron and rich in calcium carbonate, there may be a tendency of the lime formed during the heating in the furnace to react with the vanadium constituent to produce water insoluble vanadates, or during subsequent lixiviation to precipitate water insoluble vanadates. To overcome this tendency, such an ore or concentrate, after being taken from the furnace and comminuted in the usual manner, is treated with a boiling solution of an alkali sulphate, preferably a 2.5% solution of sodium sulphate, for from one and one-half to two hours; the time of boiling may be shorter or longer than here specified in accordance with the characteristics of the matter being treated. This treatment dissolves the water insoluble vanadates formed and probably produces by double decomposition such products as sparingly soluble calcium sulphate and soluble sodium vanadate. This reaction is accelerated and takes place in the presence of a small amount of calcium carbonate, which is invariably left in such an ore or concentrate.

If the above-mentioned reaction is carried out on a chemical concentrate (in contradistinction to one made by mechanical classification of the fines and the coarse residue), as, for example, a chemically derived iron cake containing calcium vanadate in admixture with other metals, then the iron and vanadium should be oxidized with a suitable reagent before precipitation, otherwise the concentrate will have to be oxidized either in the furnace or by other means. The alkali-metal sulphate solution containing the vanadium above mentioned is free of both ferrous and ferric salts, and owing to the presence of alkali-metal sulphanion, it is practically free of calcium sulphate.

It is preferable to recover the vanadium from this alkali-metal solution as vanadate of iron, using ferrous sulphate as a precipitant, which enters into double decomposition with the alkali vanadate, producing insoluble iron vanadate and soluble alkali-metal sulphate which can be used continuously in the process. To avoid an excess of precipitant in the continuous alkali-metal sulphate solution and the consequent labor in removing it, it is preferable not to precipitate all of the vanadic acid. At the same time, this makes possible the precipitation of a higher grade product without any loss of vanadium and with a corresponding saving in the amount of precipitant used.

If found expedient, either the heads or the tails of the water soluble vanadate may be treated with a boiling solution of alkali-metal sulphate. This would depend in a large measure upon the demands of the final product with respect to commercial purity, or on how much recoverable vanadic oxide, by such a treatment, remained in the tailings.

What I claim is:—

1. A process of treating vanadium ores, which includes treating the comminuted ore in a furnace to a temperature approximately 1000° C. under the influence of an oxidizing atmosphere so as to change water insoluble compounds to water soluble compounds, and then placing the furnace charge in water, whereby the soluble salts are taken up and can be removed by a well known method.

2. The process of treating vanadium and likes ores, which includes treating them in a furnace to a temperature in the neighborhood of one thousand degrees centigrade for a period of about an hour in an atmosphere of oxygen for the purpose of producing water soluble compounds, then placing the furnace charge in water to dissolve said compounds.

3. The process of treating vanadium ores which includes adding to the ores any necessary ingredients that will when heated in a furnace at a temperature of approximately 1000° C. cause the formation of water soluble compounds, subjecting the charge to this temperature in a furnace, then placing the charge in water to dissolve said compounds, whereby they are taken up and can be removed by a well known method.

4. The process of treating vanadium ores which includes heating said ores to a temperature of about one thousand degrees centigrade in a furnace to produce water soluble compounds, then treating the ore with a weak boiling solution of sodium sulphate to dissolve any water insoluble compounds formed in the charge and produce sparingly soluble calcium sulphate and soluble sodium compounds of vanadium, then treating the solution with ferrous sulphate to precipitate insoluble iron compounds of vanadium from which the vanadium can be removed in accordance with well known processes.

GEORGE KUNKLE.